(12) United States Patent  
Gutowitz et al.

(10) Patent No.: US 7,761,175 B2  
(45) Date of Patent: Jul. 20, 2010

(54) METHOD AND APPARATUS FOR DISCOVERABLE INPUT OF SYMBOLS ON A REDUCED KEYPAD

(75) Inventors: Howard Andrew Gutowitz, New York, NY (US); Terence Jones, Barcelona (ES)

(73) Assignee: Eatoni Ergonomics, Inc., Brooklyn, NY (US)

( * ) Notice: Subject to any disclaimer, the term of this patent is extended or adjusted under 35 U.S.C. 154(b) by 195 days.

(21) Appl. No.: 10/415,031

(22) PCT Filed: Sep. 27, 2001

(86) PCT No.: PCT/US01/30264

§ 371 (c)(1), (2), (4) Date: Apr. 23, 2003

(87) PCT Pub. No.: WO02/27432

PCT Pub. Date: Apr. 4, 2002

(65) Prior Publication Data

US 2004/0056844 A1 Mar. 25, 2004

(51) Int. Cl.
*G05B 15/00* (2006.01)
*G06F 3/02* (2006.01)
*G06F 13/12* (2006.01)
*H03K 17/94* (2006.01)
*B41J 5/00* (2006.01)

(52) U.S. Cl. .............. 700/84; 710/67; 341/23; 708/144; 708/145; 400/472; 345/168; 345/169; 345/172

(58) Field of Classification Search ............ 710/1, 710/62, 67, 73; 345/156, 168, 169, 170, 345/172; 700/49, 84, 90; 341/23; 708/144, 708/145; 400/472; 379/915
See application file for complete search history.

(56) References Cited

U.S. PATENT DOCUMENTS

| 1,660,254 | A | * | 2/1928 | Carroll .................. 40/451 |
| 3,833,765 | A | | 9/1974 | Hilborn et al |
| 3,929,216 | A | | 12/1975 | Einbinder |

(Continued)

FOREIGN PATENT DOCUMENTS

CN 1243982 A 2/2000

(Continued)

OTHER PUBLICATIONS

Dick Penn; "User Interface Design Principles"; Sep. 2001, Postive Interaction Inc. http//positiveinteraction.com/carleton/2001Principles.ppt.

(Continued)

*Primary Examiner*—Sean P Shechtman

(57) ABSTRACT

We discovered that a) a single key can support a multiplicity of ordered groups, b) only a subset of each group needs to be visually represented on the face of a key, c) either multi-tap or predictive methods, or both, can be used to input members of each of the groups, and d) auxiliary keys are a convenient, effective and user-discoverable method to select ordered groups, and to perform the multi-tap function. The objects of: limiting multi-tap depth, reducing keystrokes per symbol, unifying focus, increasing discoverability, graduated discoverability, power, compact presentation, and seamless integration of multi-tap and predictive text methods, can all be achieved by exploiting these discoveries.

16 Claims, 10 Drawing Sheets

U.S. PATENT DOCUMENTS

| | | |
|---|---|---|
| 4,058,795 A | 11/1977 | Balm |
| 4,360,892 A | 11/1982 | Endfield |
| 4,447,692 A | 5/1984 | Mierzwinski |
| 4,475,013 A | 10/1984 | Lee et al. |
| 4,483,628 A * | 11/1984 | Terzian ........................ 368/82 |
| 4,522,518 A | 6/1985 | Schmidt |
| 4,555,193 A | 11/1985 | Stone |
| 4,608,457 A | 8/1986 | Fowler et al. |
| 4,615,629 A | 10/1986 | Power |
| 4,650,927 A | 3/1987 | James |
| 4,674,112 A | 6/1987 | Kondraske et al. |
| 4,677,659 A | 6/1987 | Dargan |
| 4,679,951 A | 7/1987 | King et al. |
| 4,680,572 A | 7/1987 | Meguire |
| 4,715,736 A | 12/1987 | McGunnigle |
| 4,737,980 A | 4/1988 | Curtin et al. |
| 4,754,474 A | 6/1988 | Feinson |
| 4,775,255 A | 10/1988 | Langley |
| 4,791,556 A | 12/1988 | Vilkaitis |
| 4,817,129 A | 3/1989 | Riskin |
| 4,836,700 A | 6/1989 | Jensen |
| 4,866,759 A | 9/1989 | Riskin |
| 5,003,503 A | 3/1991 | Lapeyre |
| 5,031,206 A | 7/1991 | Riskin |
| 5,040,479 A | 8/1991 | Thrash |
| 5,087,910 A | 2/1992 | Guyot-sionnest |
| 5,098,425 A | 3/1992 | Baker et al. |
| 5,128,672 A | 7/1992 | Kaehler |
| 5,175,803 A | 12/1992 | Yeh |
| 5,200,988 A | 4/1993 | Riskin |
| 5,210,689 A | 5/1993 | Baker et al. |
| 5,255,310 A | 10/1993 | Kim et al. |
| 5,288,158 A | 2/1994 | Matias |
| 5,297,041 A | 3/1994 | Kushler et al. |
| 5,305,238 A | 4/1994 | Starr et al. |
| 5,332,322 A | 7/1994 | Gambaro |
| 5,339,358 A | 8/1994 | Danish et al. |
| 5,367,298 A | 11/1994 | Axthelm |
| 5,392,338 A | 2/1995 | Danish et al. |
| D357,011 S | 4/1995 | Paull et al. |
| D357,476 S | 4/1995 | Paull et al. |
| 5,410,333 A | 4/1995 | Conway |
| 5,432,510 A | 7/1995 | Matthews |
| D362,432 S | 9/1995 | Paull et al. |
| 5,458,425 A | 10/1995 | Torok |
| 5,469,160 A | 11/1995 | Yang |
| 5,473,346 A | 12/1995 | Pollack |
| 5,479,536 A | 12/1995 | Comerford |
| 5,487,616 A | 1/1996 | Ichbiah |
| 5,497,151 A | 3/1996 | Dombroski |
| 5,507,021 A | 4/1996 | Siegle |
| 5,515,305 A | 5/1996 | Register et al. |
| 5,535,119 A | 7/1996 | Ito et al. |
| 5,535,421 A | 7/1996 | Weinreich |
| 5,543,818 A | 8/1996 | Scott |
| 5,559,512 A | 9/1996 | Jainski et al. |
| 5,574,482 A | 11/1996 | Niemeier |
| 5,575,576 A | 11/1996 | Roysden |
| 5,581,243 A | 12/1996 | Ouellette et al. |
| 5,625,354 A | 4/1997 | Lerman |
| 5,627,566 A | 5/1997 | Litschel |
| 5,661,476 A | 8/1997 | Wang et al. |
| 5,661,505 A | 8/1997 | Livits |
| 5,661,605 A | 8/1997 | Conway |
| 5,664,896 A | 9/1997 | Blumberg |
| 5,675,329 A | 10/1997 | Barker et al. |
| 5,675,819 A | 10/1997 | Schuetze |
| 5,724,449 A | 3/1998 | Comerford |
| 5,724,457 A | 3/1998 | Fukushima |
| 5,734,749 A | 3/1998 | Yamada et al. |
| 5,745,056 A | 4/1998 | Takahashi et al. |
| 5,748,177 A | 5/1998 | Baker et al. |
| 5,748,512 A | 5/1998 | Vargas |
| 5,790,103 A | 8/1998 | Willner |
| 5,793,312 A | 8/1998 | Tsubai |
| 5,797,098 A | 8/1998 | Schroeder et al. |
| 5,809,415 A | 9/1998 | Rossmann |
| 5,818,437 A | 10/1998 | Grover et al. |
| 5,828,991 A | 10/1998 | Skiena |
| 5,847,697 A | 12/1998 | Sugimoto |
| 5,859,599 A | 1/1999 | Shiga |
| 5,861,821 A | 1/1999 | Kato et al. |
| 5,880,685 A | 3/1999 | Weeks |
| 5,896,321 A | 4/1999 | Miller et al. |
| 5,903,630 A | 5/1999 | Collins |
| 5,911,485 A | 6/1999 | Rossmann |
| 5,936,555 A | 8/1999 | Zagnoev |
| 5,936,557 A | 8/1999 | Liddle |
| 5,945,928 A | 8/1999 | Kushler et al. |
| 5,950,809 A | 9/1999 | Andre |
| 5,952,942 A | 9/1999 | Balakrishnan et al. |
| 5,953,541 A | 9/1999 | King et al. |
| 5,959,629 A | 9/1999 | Masui |
| 5,963,671 A | 10/1999 | Comerford et al. |
| 5,982,303 A | 11/1999 | Smith |
| 5,982,351 A | 11/1999 | White et al. |
| 5,984,548 A | 11/1999 | Willner et al. |
| 5,990,890 A | 11/1999 | Etheredge |
| 5,993,089 A | 11/1999 | Burrell, IV |
| 6,004,049 A | 12/1999 | Knox |
| 6,005,495 A | 12/1999 | Connolly et al. |
| 6,005,498 A | 12/1999 | Yang et al. |
| 6,011,554 A | 1/2000 | King et al. |
| 6,037,942 A | 3/2000 | Millington |
| 6,043,761 A | 3/2000 | Burrell, IV |
| 6,047,196 A | 4/2000 | Makela |
| 6,047,300 A | 4/2000 | Walfish et al. |
| 6,054,941 A | 4/2000 | Chen |
| 6,088,220 A | 7/2000 | Katz |
| 6,121,960 A | 9/2000 | Carroll et al. |
| 6,130,628 A | 10/2000 | Schneider-Hufschmidt et al. |
| 6,150,962 A | 11/2000 | Rossmann |
| 6,160,536 A | 12/2000 | Forest |
| 6,172,625 B1 | 1/2001 | Jin et al. |
| 6,181,328 B1 | 1/2001 | Shieh et al. |
| 6,184,803 B1 | 2/2001 | Burrell, IV |
| 6,219,731 B1 | 4/2001 | Gutowitz |
| 6,232,892 B1 * | 5/2001 | Burrell, IV ................... 341/22 |
| 6,232,956 B1 | 5/2001 | Mailman |
| D443,615 S | 6/2001 | Kirchner |
| 6,243,460 B1 | 6/2001 | Bhagavatula |
| 6,262,716 B1 | 7/2001 | Raasch |
| 6,271,835 B1 | 8/2001 | Hoeksma |
| 6,286,064 B1 | 9/2001 | King et al. |
| 6,295,052 B1 | 9/2001 | Kato et al. |
| 6,295,509 B1 | 9/2001 | Driskell |
| 6,307,548 B1 * | 10/2001 | Flinchem et al. ............ 345/811 |
| 6,307,549 B1 | 10/2001 | King et al. |
| 6,356,258 B1 | 3/2002 | Kato et al. |
| 6,359,572 B1 | 3/2002 | Vale |
| 6,405,060 B1 | 6/2002 | Schroeder et al. |
| 6,492,977 B1 | 12/2002 | Marshall |
| 6,587,675 B1 | 7/2003 | Riddiford |
| 6,636,162 B1 | 10/2003 | Kushler et al. |
| 6,646,573 B1 | 11/2003 | Kushler et al. |
| 6,661,404 B1 | 12/2003 | Sirola et al. |
| 6,703,963 B2 | 3/2004 | Higginson |
| 6,734,881 B1 | 5/2004 | Will |
| 6,771,191 B2 | 8/2004 | Motoe |
| 6,900,794 B1 | 5/2005 | San |
| 6,903,723 B1 | 6/2005 | Forest |
| 6,190,256 B1 | 8/2006 | Stephanick et al. |
| 2001/0011271 A1 | 8/2001 | Takahashi et al. |
| 2001/0040550 A1 | 11/2001 | Vance et al. |

| | | | |
|---|---|---|---|
| 2002/0044814 A1 | 4/2002 | King et al. | |
| 2002/0196163 A1 | 12/2002 | Bradford et al. | |
| 2003/0006956 A1 | 1/2003 | Wu et al. | |
| 2004/0165924 A1 | 8/2004 | Griffin | |
| 2004/0247362 A1 | 12/2004 | King et al. | |

FOREIGN PATENT DOCUMENTS

| | | |
|---|---|---|
| DE | 3235752 A1 | 3/1984 |
| EP | 28533 A2 | 5/1981 |
| EP | 66991 A2 | 12/1982 |
| EP | 279555 A2 | 8/1988 |
| EP | 319193 A2 | 6/1989 |
| EP | 364112 A2 | 4/1990 |
| EP | 201294 B1 | 7/1991 |
| EP | 213022 B1 | 9/1991 |
| EP | 457077 A2 | 11/1991 |
| EP | 595114 A1 | 5/1994 |
| EP | 651315 A1 | 5/1995 |
| EP | 779759 A3 | 6/1997 |
| GB | 2299884 A | 10/1996 |
| GB | 2343414 A1 | 5/2000 |
| JP | 9128134 A2 | 5/1997 |
| JP | 10177446 A2 | 6/1998 |
| JP | 10207608 A2 | 8/1998 |
| JP | 11272403 A2 | 10/1999 |
| WO | WO 85/01596 A1 | 4/1985 |
| WO | WO 89/02369 A1 | 3/1989 |
| WO | WO 91/03782 | 3/1991 |
| WO | WO 91/03782 A1 | 3/1991 |
| WO | WO 92/12491 A1 | 7/1992 |
| WO | WO 94/06139 A1 | 3/1994 |
| WO | WO 95/18405 A1 | 7/1995 |
| WO | WO 96/02394 A1 | 2/1996 |
| WO | WO 96/27947 A1 | 9/1996 |
| WO | WO 96/30822 A1 | 10/1996 |
| WO | WO 97/05541 A1 | 2/1997 |
| WO | 544123 A3 | 4/1997 |
| WO | WO 97/30386 A1 | 8/1997 |
| WO | WO 98/08688 A1 | 3/1998 |
| WO | WO 98/09270 A1 | 3/1998 |
| WO | WO 98/16055 A1 | 4/1998 |
| WO | WO 98/33110 A1 | 7/1998 |
| WO | WO 98/33111 A1 | 7/1998 |
| WO | 10207601 A2 | 8/1998 |
| WO | WO 99/15951 A1 | 4/1999 |
| WO | WO 99/30222 A1 | 6/1999 |
| WO | WO 00/08547 A1 | 2/2000 |
| WO | WO 00/35091 * | 6/2000 |
| WO | WO 00/35091 A | 6/2000 |
| WO | WO0153924 * | 7/2001 |
| WO | WO 2005/026897 A2 | 3/2005 |

OTHER PUBLICATIONS

D.S. Blough; "Pigeon perception of letters of the alphabet"; Science (1982) Oct. 22; 218(4570) 397-8 (abstract).

D.Blough; "The Perception of Similarity"; in Avian Visual Cognition; E: Robert G. Cook. http//www.pigeon.psy.tufts.edu/avc/toc.htm (Sep. 2001).

Jean Mark Gowron; "Groups, Modular Arithmetic, and Cryptography"; Linguistics; San Diego State University ; www.rohan.sdsu.edu/-gawron; Jul. 24, 2004.

J.P. Davis; "Let your fingers do the spelling"; disambiguating words spelled with the telephone keypad, Avros Journal; 9:53-66; Mar. 1991.

Dick Penn, User Interface Design Principles, Sep. 2001. Positive Interaction Inc. http://positiveinteraction.com/carleton/2001Principles.ppt.

DS. Blough Pigeon perception of letters of the alphabet, Science Oct. 22,1982;218(4570) 397-8 (abstract).

D. Blough, The Perception of Similarity, in Avian Visual Cogntion, Ed: Robert G. Cook. http://www.pigeon.psy.tufts.edu/avc/toc.htm, Sep. 2001.

* cited by examiner

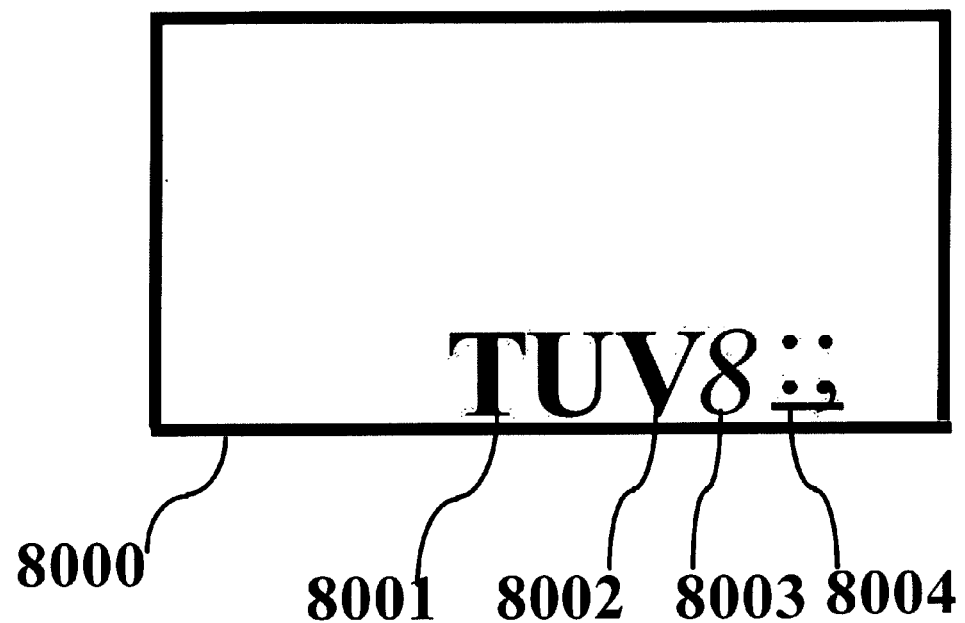

METHOD AND APPARATUS FOR DISCOVERABLE INPUT OF SYMBOLS ON A REDUCED KEYPAD

CROSS REFERENCE TO RELATED APPLICATIONS

This application claims the benefit of the provisional application entitled "Method and Apparatus for Entering Symbol Sequences" filed Sep. 27, 2000 in the U.S., bearing Application No. 60/235,722, the provisional application entitled "Method, Apparatus and System for Alphanumerical Character and Punctuation Symbol Entry" filed Nov. 7, 2000 in the U.S., bearing Application No. 60/246,555, and the provisional application entitled "Method and Apparatus for Accelerated Entry of Symbols on a Reduced Keypad" filed Mar. 20, 2001 in the U.S., bearing Application No. 60/277,293, the contents of which are relied upon and incorporated by reference.

FIELD OF INVENTION

This invention relates to the design of, apparatuses for the input of symbols more particularly, to apparatuses for discoverable input of symbols with reduced keyboards.

BACKGROUND OF THE INVENTION

A standard desktop computer keyboard contains 100 or more keys. The keyboard may be used to encode many more symbols than it has keys, including letters, capital letters, accented letters, digits, punctuation symbols, and functional symbols such as symbols to encode cursor movement, character deletion, or shortcut access to the internet. Therefore, many of the keys are typically called on to encode more than one symbol. As the number of different functions a computer keyboard needs to perform is increasing, the number of keys on a typical keyboard is increasing, leading to recent keyboards the size of platters for serving turkey.

When we turn to reduced keyboards such as telephone keypads, the constraints governing the encoding of many symbols on few keys become much more severe. When there are many symbols on a key, some means must be provided to disambiguate the symbols, that is, to decide which symbol is intended for input. There are generically three basic approaches to disambiguating multi-symbol keys:

1) chording or shifting mechanisms, in which several keys are pressed at once, the typical example being the cap-shift key which disambiguates lower and upper case letters; 2) multi-tap mechanisms in which a key is pressed sequentially a different number of times depending on which of the symbols associated to the key is intended, telephone keypads often work this way, where the 2 key, for instance, is pressed once to input an "a", twice to input a "b", and three times to input a "c"; and 3) predictive-text methods in which software is used to predict which symbol is meant. An example here is the method of Riskin U.S. Pat. No. 5,031,206.

Recent advances have been made to optimally combine these methods. For instance, Gutowitz U.S. Ser. No. 09/347,188, hereby incorporated by reference, teaches an optimal method to combined a multi-tap mechanism and a predictive method. Gutowitz PCT/US99/29,343, hereby incorporated by reference, teaches a method to optimally combine a shifting mechanism with a predictive mechanism.

Extension of those teachings to the input of large symbol sets comprising digits, punctuation symbols, functional symbols, accented letters and the like, introduces a number of subtle but important problems. When the number of symbols to be encoded is very large, and the number of keys is very small, additional constraints are introduced beyond those having to do with proper disambiguation. These constraints arise due to many symbols needing to be represented on a single key. In particular, on a telephone keypad with small keys, even labelling the key with all of the symbols it needs to encode may be difficult. These problems are solved by the present invention.

OBJECTS OF THE INVENTION

It is an essential object of this invention to provide a method and apparatus for ergonomic entry of letters, punctuation symbols, digits, and functional symbols. Objects of this invention further comprise:

Limited multi-tap depth. User studies show that one of the most annoying aspect of multi-tap is that some symbols may require many extra taps. For instance, the letter ôsö requires four taps in standard multi-tap. In the present invention multi-tap depth is limited since most symbols can be obtained, depending on the embodiment, either with a) a auxiliary shift key, or b) one extra keystroke. Some rare symbols may require two or more extra keystrokes.

Reduced keystrokes per symbol. As just stated, it is a desirable feature of this invention that it limits the number of keystrokes required to enter any symbol (the worst case). It is an additional object of this invention to decrease the expected number of keystrokes to enter most symbols (the average case).

Unified focus. Beginning users tend to keep their attention focused on the keypad, while more advanced users tend to keep their attention focused on the display. For the sake of usability, it is of paramount importance to avoid forcing the user to shift focus from keypad to screen and back again. In the present invention, keypad labeling provides the beginner user a way to find all or most symbols without reference to the display. Advanced users, who have learned the assignment of symbols to keys, can keep their attention focused on the display.

Discoverability. All or most symbols are visually coded in such a way that the key operations required to enter these symbols are evident from visual inspection, in a language-independent way. This coding helps the beginning user to discover, by simply scanning the keypad, how to operate the keypad.

Graduated discoverability. Symbols are organized within ordered groups according to their probability. The most probable symbols can be obtained in an easy-to-discover way, with few keystrokes. It may be more difficult to discover how to enter rarer symbols, and rarer symbols may require more laborious multiple tapping. In order to encode a large number of symbols on a limited number of keys, some symbols must require more information to specify. The advantage of the present invention is that the additional information requirement is concentrated on rare symbols, symbols which can be easily avoided by average users, and in typical circumstances.

Power. It is a given that the importance of text entry on cell phones and other handheld devices will grow, and the variety of uses to which text entry on these devices will be put will expand. The present invention provides all punctuation symbols found on a standard Qwerty keyboard. It could be used, for instance, to edit computer programs. Being both discoverable and powerful, the present invention can satisfy the needs of the full spectrum of users.

Compact presentation. By combining morphically related symbols, the present invention economizes keypad space. It allows several symbols to be presented for visual inspection in no more space than is required by a single symbol. This object is particularly important for handheld devices such as cell phones in which the keys may be very small, with very limited surface area available for labels.

Seamless integration of multi-tap and predictive text methods. In the prior art, these methods are generally presented in the alternative. However, according to the teachings of this invention, both multi-tap and predictive methods can be seamlessly integrated in a single apparatus, and thus the user can take advantage of both methods, increasing usability of text input mechanisms.

BRIEF DESCRIPTION OF THE DRAWINGS

The invention will described in reference to a sequence of figures.

FIG. 8 shows a visual display for multiple ordered groups.

FIG. 9B shows the same illumination apparatus representing backlighting of the keypad of FIG. 1 with the backlighting turned on.

SUMMARY OF THE INVENTION

The core inventive idea, some ramifications of which are developed into the preferred embodiment presented below, is that a) a single key can support a multiplicity of ordered groups, b) only a subset of each group needs to be visually represented on the face of a key, c) either multi-tap or predictive methods, or both, can be used to input members of each of the groups, and d) auxiliary keys are a convenient and effective method to select ordered groups, and to perform the multi-tap function. The objects of this invention: limited multi-tap depth, reduced keystrokes per symbol, unified focus, discoverability, graduated discoverability, power, compact presentation, and seamless integration of multi-tap and predictive text methods, can all be achieved by exploiting the core inventive idea.

Accordingly, this invention teaches an apparatus for the entry of symbols comprising a multiplicity of keys wherein at least one of said keys is effective to input a multiplicity of ordered groups of symbols, wherein at least two of said ordered groups of symbols input by said at least one key comprise at least two symbols, and further comprising an iterator mechanism or predictive mechanism to select members of the ordered groups for input.

DETAILED SPECIFICATION

Figure 1:
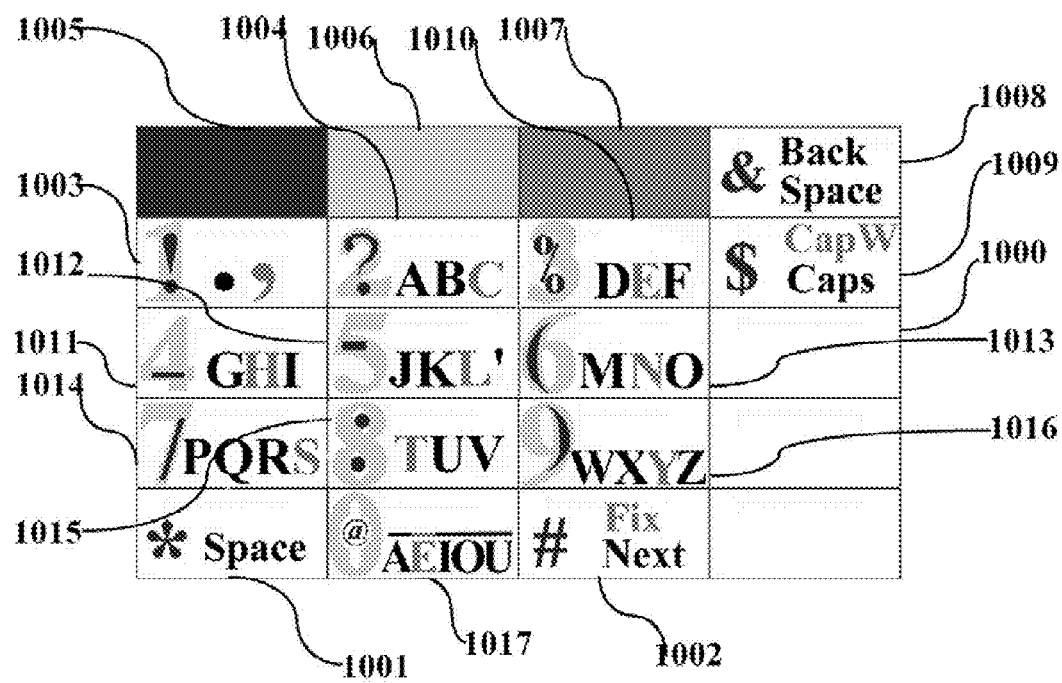
FIG. 1 shows the keypad of an apparatus built according to the preferred embodiment of the invention.

The invention is first described in reference to FIG. 1. FIG. 1 shows an apparatus 1000 for the entry of letters, including accented letters, as well as punctuation, digits, and various functional symbols. The apparatus comprises a plurality of keys. Some of the keys, such as 1001, are used for inputting only punctuation, in this case the * symbol, and the space symbol. Other keys, such as 1002 are used to input symbols and to perform functions, in this case, the # symbols, and the fix and next functions. These functions will be described below. Other keys are for the entry of peculation symbols and digits, such as 1003 which is for the entry of the digit 1 and the punctuation symbols ! (exclamation point) , (comma) and . (period). Still others, such as 1016, are for the entry of digits, punctuation symbols, and letters, in this case the digit 9, the symbol ) (right parenthesis) and the letters w, x, y, and z. In accordance with the teachings of this invention, one of the keys 1005 is a punctuation auxiliary key, which is electronically coupled to at least some of the keys which input punctuation symbols (e.g. 1001-1004) such that when the punctuation auxiliary key is actuated in conjunction with keys which input inter alia punctuation symbols, then one of the punctuation symbols from the key is input provided that these punctuation symbols are contained in a punctuation ordered group associated with the punctuation auxiliary key. This punctuation auxiliary key, depending on the implementation, could be actuated before, after, or during the activation of the corresponding punctuation ordered-group key. In a preferred arrangement, the punctuation auxiliary key functions like a shift key. That is, while it is actuated ("held down" in the case of mechanical keys) all punctuation keys which are also actuated ("pressed" in the case of mechanical keys) will input one of the punctuation symbols to which they are associated. An apparatus built in accordance with the teachings of this invention may comprise a second auxiliary key 1006 which when actuated in conjunction with one of the keys which inputs digits inter alia (e.g. 1003 or 1004), serves to select one of the digits associated to the digit key for input. The second auxiliary key, like the first auxiliary key, can be actuated before, after, or during the activation of the corresponding digit key in order to have its effect of selecting one of the digits for input.

An apparatus built in accordance with the teachings of this invention may further comprise a third auxiliary key 1007 which when operated in conjunction with one of the keys which encodes inter alia letters (such as 1004) serves to select one or more of the letters associated to the letter key. In the apparatus depicted in FIG. 1, the letters selected are the letters CEHLNSTY, this selection is according to the invention disclosed in Gutowitz PCT/US99/29,343, which has been incorporated by reference.

Operation of the Punctuation Auxiliary Key

Figure 2:
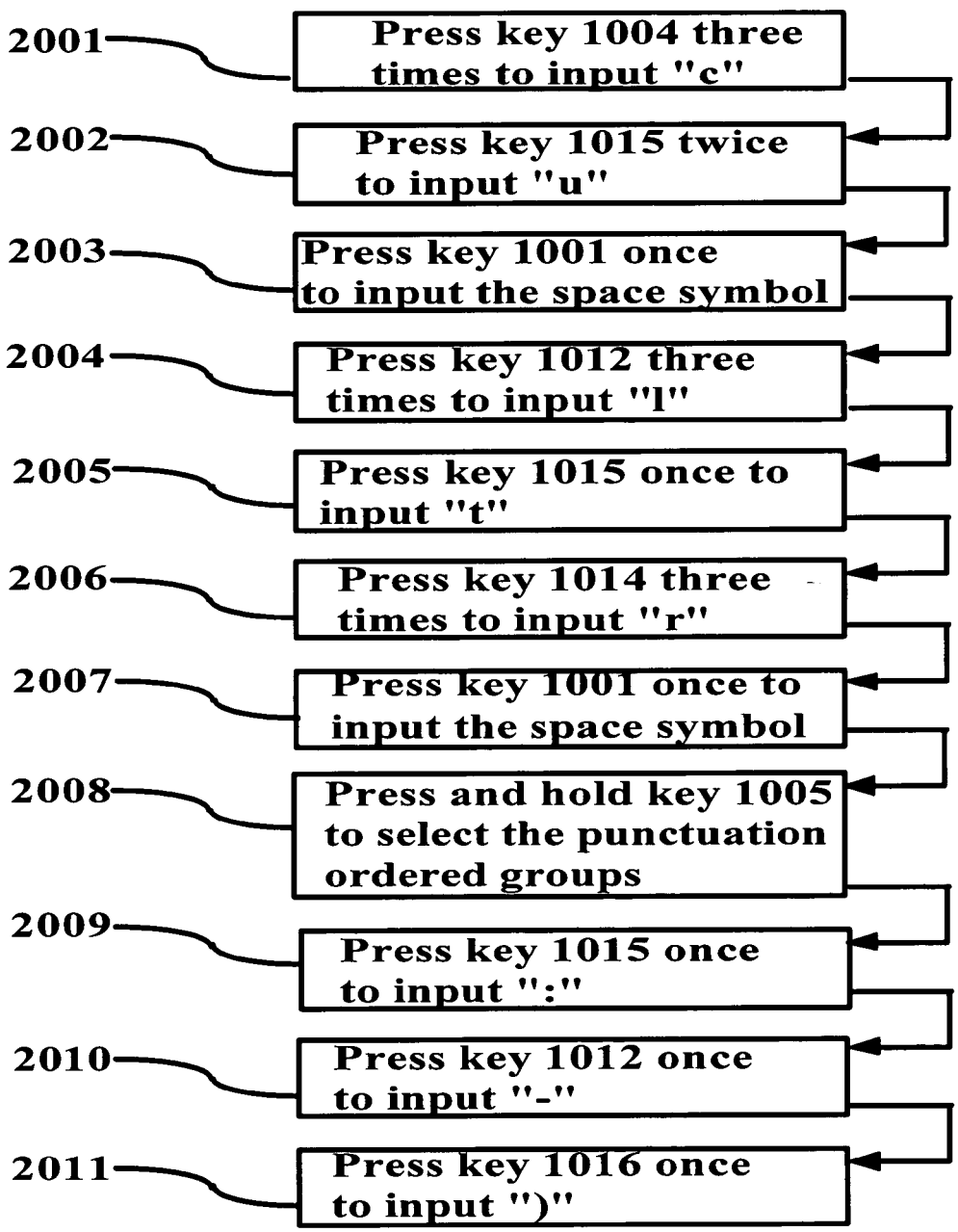
FIG. 2 shows an example use of the punctuation key.

The punctuation auxiliary key 1005 is used to input punctuation symbols. Its operation will be described in reference to FIG. 2. FIG. 2 describes the entry of a phrase, cu ltr :-) when the punctuation auxiliary key is used in conjunction with a multi-tap mechanism for entering letters. In the present example, the punctuation auxiliary key is embodied as a shift key, which is the preferred embodiment. That is, the punctuation auxiliary key can be held down, and as long as it is held down it produces the effect of selecting a punctuation symbol to be selected from a key encoding punctuation symbols assigned to a punctuation ordered group. Alternate methods to embody the punctuation auxiliary key include a) the punctuation auxiliary key is pressed and released: it takes effect on the next multiple-ordered group key pressed, b) the punctuation auxiliary key is pressed after the punctuation multiple-ordered group key and has effect on the multiple-ordered-group key previously pressed, c) the punctuation auxiliary key is a mode-lock key: once pressed, in remains in effect for all subsequent punctuation multiple-ordered-group key presses, until the punctuation auxiliary key is pressed again, d) the punctuation auxiliary key is represented by a length of key pressing, for instance, if a multiple-ordered-group key to which both a letter ordered group and a punctuation ordered group have been assigned is pressed rapidly, then a letter is input, while if it is pressed and held down then a punctuation symbol is entered. Further means to embody a punctuation auxiliary key according to the teachings of this invention will be evident to those skilled in the art. The same is true of other auxiliary keys to be introduced below. The essential feature of this aspect of the invention is that the punctuation auxiliary key serves to select a punctuation ordered group from the plurality of symbols, potentially including letter symbols, encoded by the multiple-ordered-group keys to which both letter and punctuation ordered groups have been assigned.

For the flow chart of FIG. 2, the association of symbols with keys as shown in FIG. 1. is assumed, that is, one key encodes the letters abc, and the punctuation symbol ?, etc. This particular association of symbols to keys will be discussed extensively below, it contains many inventive features for which patent rights will be herein claimed.

Thus, in the first step 2001 of FIG. 2, key 1004 is pressed three times to enter the letter "c", then (step 2002) key 1015 is pressed twice to input the letter "u", then (step 2003) key 1001 is pressed once to input the space symbol, then (step 2004) key 1012 is pressed three times to input the letter "l", then (step 2005) key 1015 is pressed once to input the letter "t", then entered (step 2006) key 1014 is pressed three times to input the letter "r", then (step 2007) key 1001 is pressed once to input the space symbol, then (step 2008) the punctuation auxiliary key 1005 is pressed and held down while keys 1015, 1012, and 1016 are pressed in succession (in steps 2009. 2010, and 2011) to produce the emoticon :-).

Operation of the Digit Auxiliary Key

An apparatus built according to the teachings of this invention may further comprise a digit auxiliary key. If at least one of the plurality of multiple-ordered-group keys of the invention have been assigned both a letter ordered group and a digit ordered group, then the digit auxiliary key operates such that when the digit auxiliary key is actuated in conjunction with one of the multiple-ordered-group keys to which both a letter ordered group and a digit ordered group have been assigned then at least one of the digits in the digit ordered group is input, and when one of multiple-ordered-group keys to which both a letter ordered group and a digit ordered group have been assigned is actuated not in conjunction with the digit auxiliary key then at least one of the letters in the ordered group of letters assigned to the multiple-ordered-group key is input.

Figure 3:
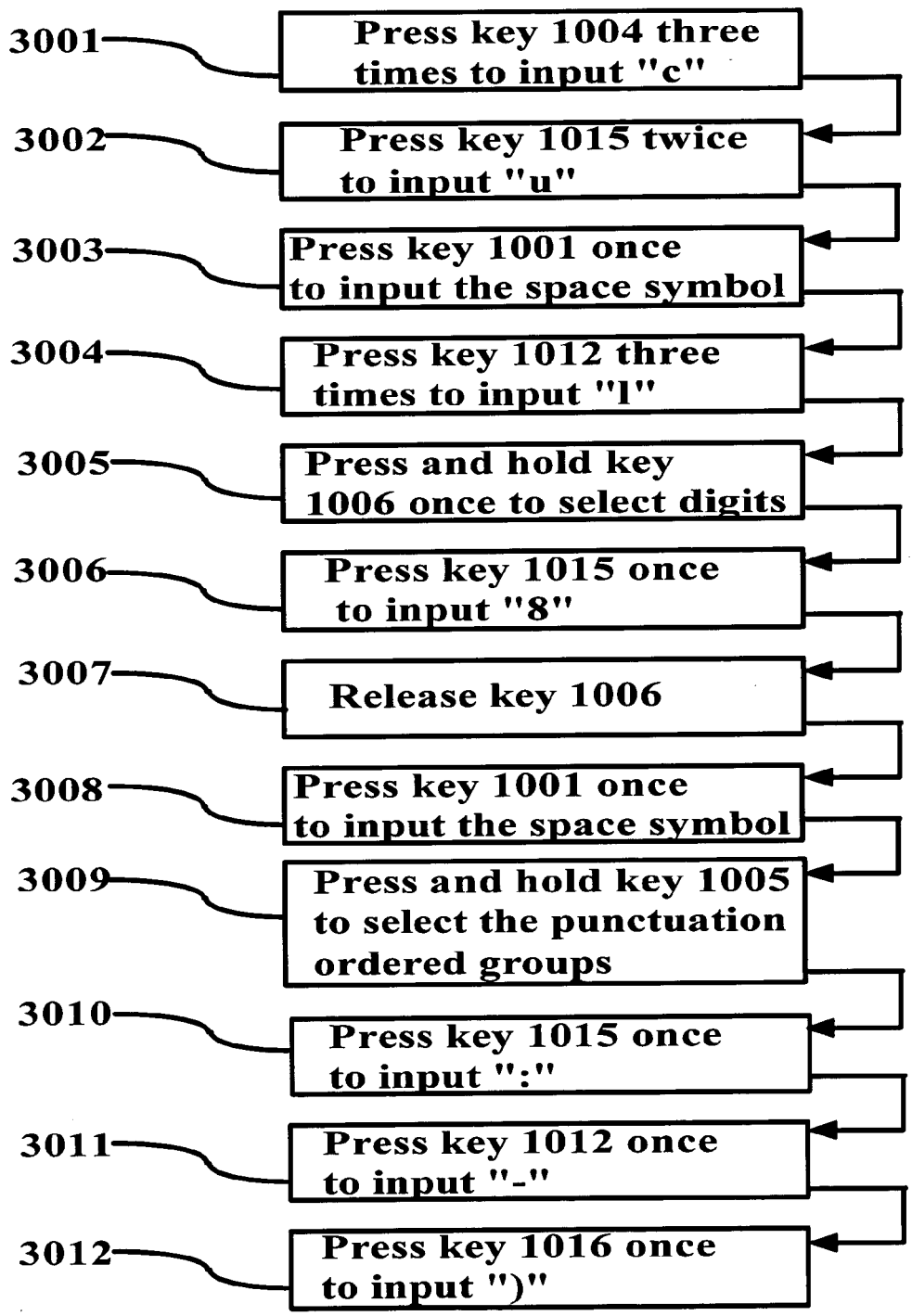
FIG. 3 shows an example use of the digit key.

In other words, the present invention also provides for a digit auxiliary key to be used for inputting digits. Its function is similar to the punctuation auxiliary key, except that while the punctuation auxiliary key selects a punctuation symbol from a multiple-ordered-group key to which a punctuation ordered group has been assigned, the digit auxiliary key selects a digit from a multiple-ordered-group key to which a digit ordered group has been assigned. Thus, for example, if the phrase to be entered were "cu l8r :-)" it could be input as shown in FIG. 3. Steps 3001-3004 of FIG. 3 are identical to steps 2001-2004 of FIG. 2, and serve to input "cu l", in step 3005, the digit auxiliary key 1006 is actuated such that when key 1015 is actuated in step 3006, the digit 8 is input. In step 3007, the digit auxiliary key 1006 is released. Then, in step 3008, key 1001 is pressed once so that a space is input. Then, in step 3009, key 1005 is pressed and held to select the punctuation ordered groups. Then, in step 3010, key 1015 is pressed once to input ":". Then, in step 3011, key 1012 is pressed once to input "-", and finally in step 3012, key 1016 is pressed once to input ")".

Operation of the Disambiguation Auxiliary Key

Figure 4:
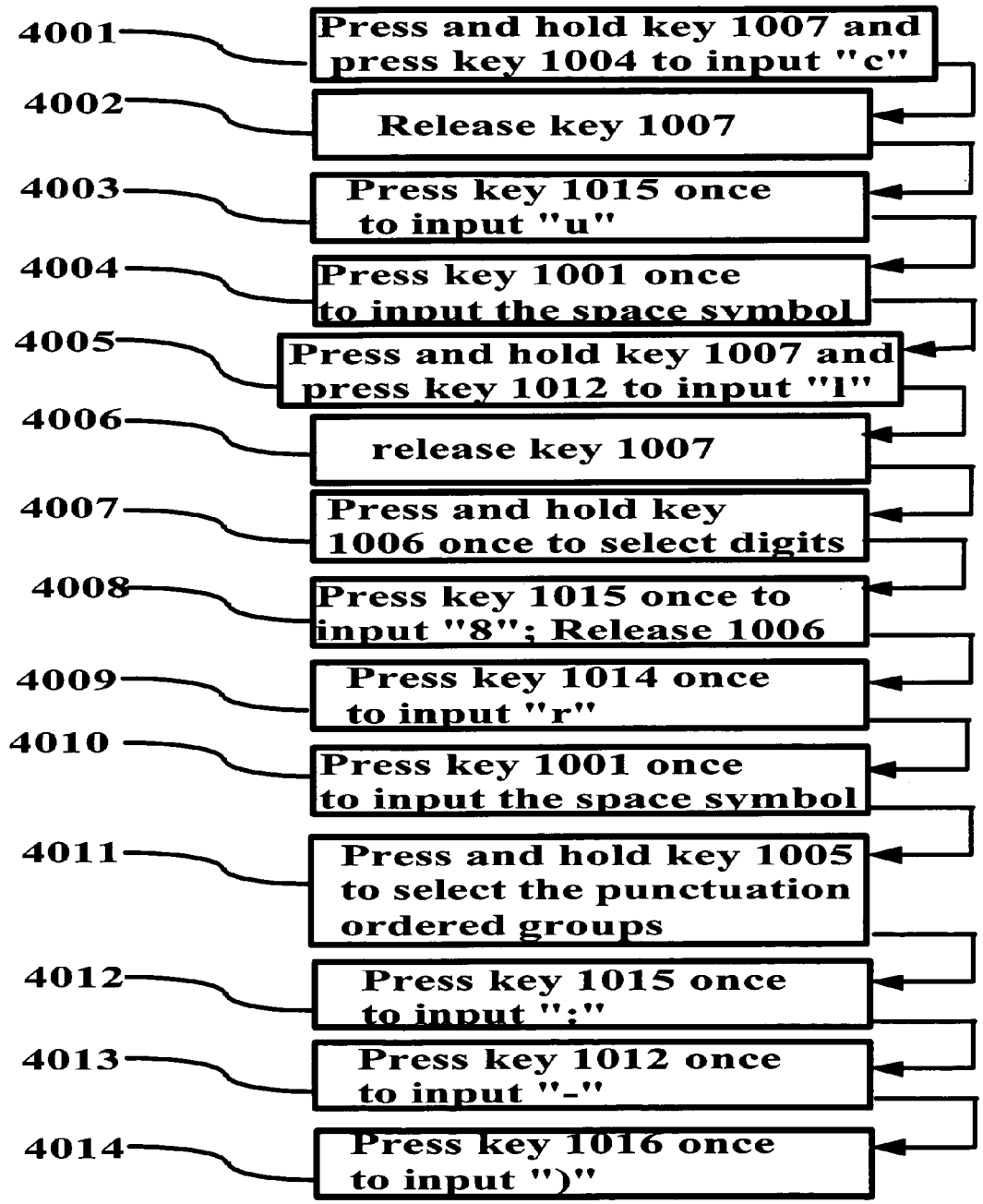
FIG. 4 shows an example use of the disambiguation key.

Some embodiments of the present invention may provide a disambiguation auxiliary key whose purpose is to select certain letters for input unambiguously. The selection of the letters to be input may be done according to the invention disclosed in Gutowitz '343, but, according to the present invention, may be chosen according to any scheme. For the purposes of illustration, we will use the scheme of Gutowitz '343, in which the letters CEHLNSTY are selected from the keys 2-9 respectively. In the invention disclosed in Gutowitz '343, the other letters are selected by predictive software. Thus, returning to the example phrase "cu l8r :-)", and referring to FIG. 4, we see that the phrase can be entered with the help of the punctuation, digit, and disambiguation auxiliary keys as follows: In step 4001, the disambiguation auxiliary key 1007 is actuated, along with the key 1004. This inputs the letter "c". In step 4002, the disambiguation auxiliary key 1007 is released, and then in step 4003 key 1015 is actuated. Thanks to the predictive software, activation of key 1015 inputs the letter "u". Then, in step 4004, key 1001 is actuated to input a space. Actuation of key 1007 in conjunction with key 1012 inputs "l" in step 4005. Key 1007 is then released in step 4006. Actuation of the digit auxiliary key 1006 (step 4007) in conjunction with key 1015 inputs the digit 8 (steps 4008). Step 4008 is completed by the release of key 1006. Then, in step 4009, key 1014 is actuated upon which, thanks to the predictive software, the letter "r" is entered. In steps 4010, key 1001 is pressed once to enter the space symbol. Then (step 4011) key 1005 is pressed and held to select the punctuation ordered groups. Then (step 4012) key 1015 is pressed once to input ":". Then (step 4013) key 1012 is pressed once to input "-". Then (step 4014) key 1016 is pressed once to input ")".

Operation of the Fourth Auxiliary Key

Capitalization Key

The fourth auxiliary key 1009 is used to input capital letters. As in the case of the first, second, and third auxiliary keys, the fourth auxiliary key is operated in conjunction with other keys in order to perform an input action. As in the case of these other auxiliary keys, the fourth auxiliary key might be actuated before, after, or during the activation of said other key in order to perform the required action. In a preferred arrangement, the fourth auxiliary key is actuated after the other key in order to perform the action of capitalization. Thus, if it is desired to input the capital letter óCö, and an embodiment comprising a third auxiliary key is used as described in FIG. 4, then the third auxiliary key 1007 would be actuated in conjunction with key 1004 to input "c", then the fourth auxiliary key 1009 would be actuated in change the lower-case "c" to an upper-case "C". The advantage of this arrangement is that it permits a novel and unobvious ergonomic extension of the capitalization action. Thus, the present invention provides for a new action, the "CapW" (Capitalize Word) action. The CapW action is obtained when some other auxiliary key is operated in conjunction with the capitalization key 1009. Preferably, said other auxiliary key is the disambiguation key 1007, if present. This preference arises from the observation that capitalization is only relevant for letters, not digits or punctuation symbols, so it is natural to associate a capitalization action with another key acting to input letters. Capitalization needs may arise in several ways, for instance, the first letter of a word may need to be capitalized if the word is a proper noun: Fred. Or, the word may need to be entirely capitalized, if it is an acronym: FRED. Other patterns of capitalization, such as every other letter capitalized, might be required in other circumstances: DoCoMo. The CapW key provides the ability to supply at least one capitalization pattern. Once the patterns are defined, repeated activation of the CapW key scrolls through the available patterns.

Figure 5:
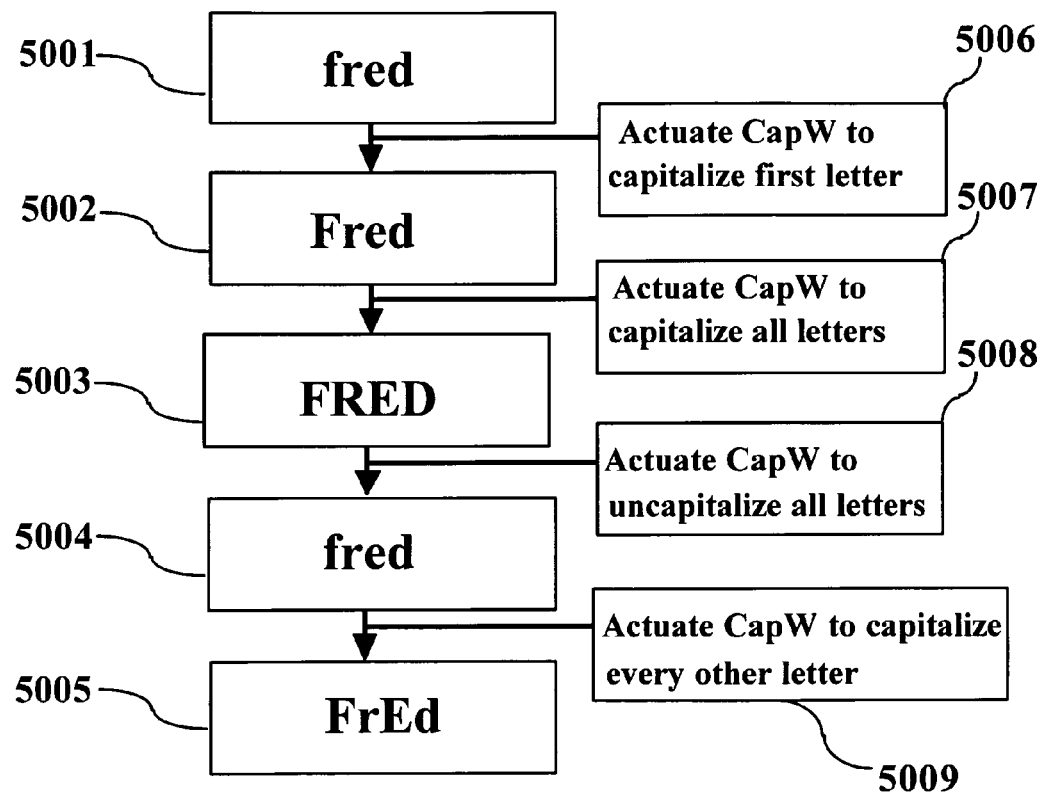
FIG. 5 shows an example use of the CapW key.

For instance, assume that three patterns are defined, capitalize first letter, capitalize all letters, and uncapitalize all letters. Then, referring to FIG. 5, we disclose the steps to be taken to input the capitalized letter sequence FRED. In step 5001, "fred" is entered. This input could be by any means, multi-tap, predictive, or other. Then, in step 5006, the CapW key 1009 is actuated, to apply the capitalization pattern of capitalizing the first letter of a word. This activation is preferably by operation of key 1007 substantially simultaneously with key 1009. This first activation of the CapW key after the sequence "fred" is entered produces the sequence "Fred" (5002). A second activation of the CapW key in step 5007 applies the capitalization pattern capitalize all letters to produce the sequence "FRED" (5003). If the user then decides to cancel all capitalization, another consecutive activation of the CapW key (5004)

will return the input to the uncapitalized word "fred" (5005) by applying the capitalization pattern uncapitalize all letters. Another capitalization pattern capitalize every other letter is applied at step 5009 to produce FrEd (5005).

Operation of the Fifth Auxiliary Key

Symbol Advance Key

Figure 7:
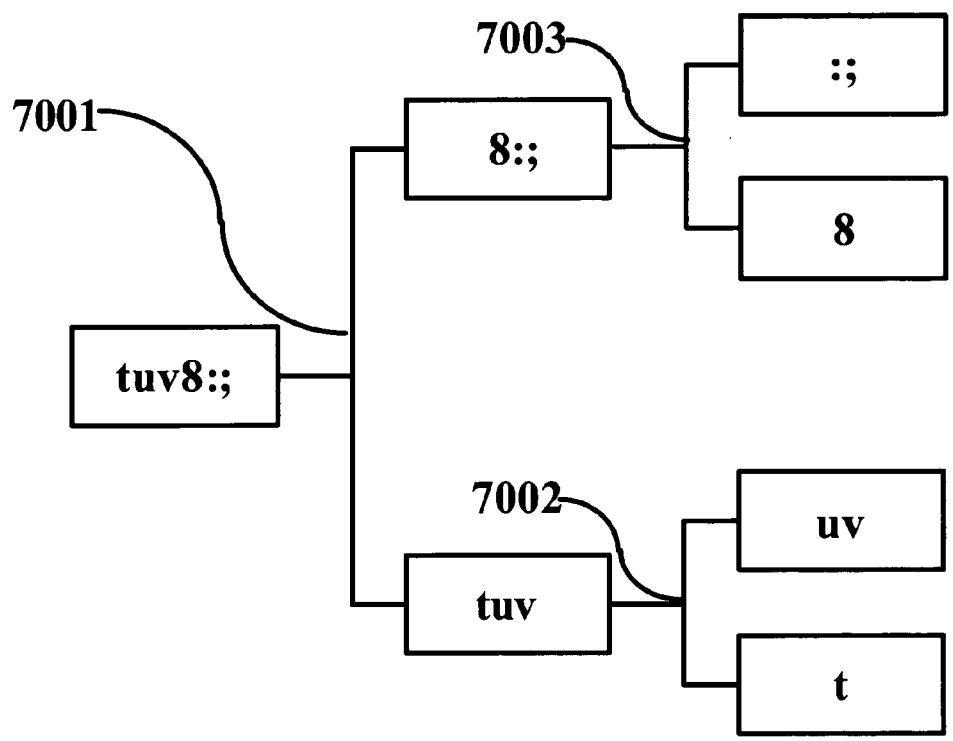
FIG. 7 shows splitting of ordered groups with the addition of auxiliary keys, and an example use of the symbol advance key.

The symbol advance key, or "next" key 1002, provides the action of selecting symbols by advancing in an order defined on a group of symbols. That is, if symbols a1,a2, . . . , an are arranged in an ordered group, then a2 follows a1, a3 follows a2, and so on. Typically, an ordered group will have a circular order, so that a1 follows an. An ordered group may include all of the symbols on a key, or only a subset of the symbols on a key. The collection of symbols into ordered groups is an important design decision in the construction of reduced keyboards. For instance, consider the case of key 1015. This key encodes three letters t, u, and v, a digit, 8, and a punctuation symbol colon (:). It might also encode other symbols, such as the semi-colon symbol (;), which are not displayed on the face of the key. These symbols could all be placed in a single order, for instance tuv8:;, or in ordered groups, such as all letters in one group, and all digits and punctuation in a second group. According to the teachings of this invention, the division of symbols into groups is governed by the presence and type of auxiliary keys. For instance, an apparatus which provides only a punctuation key should provide symbols divided into two groups. One group contains symbols input when the punctuation key is actuated, and the other contains symbols which are input when the punctuation key is not actuated. Thus, in this example, the symbols t, u, and v could be in one ordered group, and the symbols 8:; could be in another ordered group. Referring now to FIG. 7, we see that at step 7001, a punctuation key has been added to the apparatus, dividing the ordered group into two ordered groups as just described. If a disambiguation key is also present, and the disambiguation key serves to select the letter t, then the groups should be: (t)(uv)(8:;). The splitting effect of the addition of the disambiguation key is shown at step 7002. Finally, if a digit key is also provided, then the groups should be (t)(uv)(8)(:;). The splitting effect of the digit key is shown at step 7003. The effect of this aspect of the invention is that the addition of each auxiliary key reduces the size of the ordered groups, limiting the multi-tap depth, a desirable advantage of this invention. FIG. 7 also explains the effect of the symbol advance key. Before ordered group splitting at step 7001, the symbol advance key inputs the symbols tuv8:; in order, as the symbol advance key is actuated multiple times in succession. Then, after the ordered group split due to the punctuation key, the symbol advance key inputs either the symbols tuv in order, or the symbols 8:; in order depending on whether the punctuation key has not or has been actuated, respectively.

Figure 6:
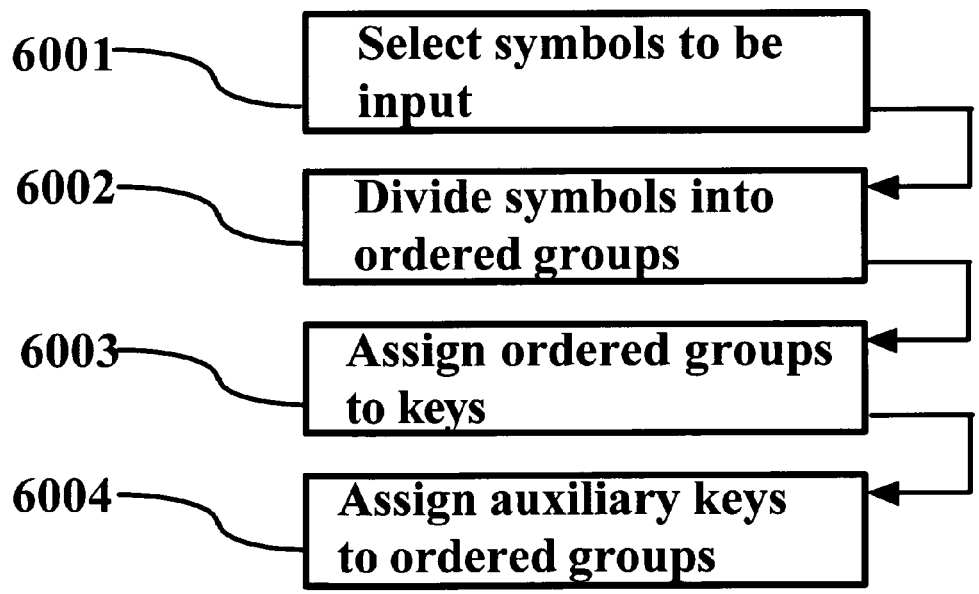
FIG. 6 method for making typable devices according to the teachings of this invention.

Thus, referring to FIG. 6 a method for generating typable devices according to the teachings of this invention comprises the steps of:

6001 selecting a plurality of symbols to be input,

6002 assigning a plurality of said plurality of symbols to ordered groups,

6003 assigning said ordered groups to keys such that at least one key is assigned more than one ordered group, and such that each key is effective to input members of said assigned ordered groups.

If the typable device has at least one auxiliary key then some of the ordered groups can be associated to the auxiliary key or keys, so that the method can further comprise step, and

6004 assigning one or more of said assigned ordered groups to an auxiliary key engaged with said keys assigned ordered groups such that when said auxiliary key is actuated in conjunction with said keys assigned ordered groups then one of said assigned ordered groups is selected preferentially for input.

Integration of Predictive Mechanisms

It is a desirable feature of this invention to limit the number of keystrokes required to enter any symbol (the worst case), and to decrease the expected number of keystrokes to enter most symbols (the average case). Each additional auxiliary key helps further reduce the worst-case number of keystrokes, whether the symbol advance is accomplished by multiple pressing of a key, or, preferably using an auxiliary symbol advance key. It is evident to one skilled in the art that the process of adding additional auxiliary keys could be carried to the extreme in which every symbol is entered unambiguously using a symbol key in conjunction with an auxiliary key. The problem with this is that in the case of reduced keyboards, the number of keys which can be incorporated is highly limited. In most cases, ordered groupings will contain more than one symbol. If there are statistical regularities in the occurrences of symbols within an ordered group, then software can be designed to predict which symbol should preferentially occur in any given context. Examples of such software have been previously cited. In every case, the function of the software is to change the ordering within an ordered group. Thus, in the case of the key 1015, predictive software might determine that the ordered group (uv) should be ordered (vu) in certain circumstances. For example, if the letters "wea" had been previously entered, then "v" is more likely intended when the key 1015 is pressed, since "weave" is a word in English, but no word begins "weau". Similarly, for the punctuation ordered group (:;) there may be contexts in which a semi-colon is more likely than a colon, and thus, in that context, semi-colon should be first in the ordering. As an example, it could be that the emoticon ;-) is more common than the emoticon :-). If so, predictive software may determine that when it encounters an activation of the key 1015 with the punctuation key actuated, and followed by activations of keys 1012 and 1016 with the punctuation key actuated, then semi-colon should be input rather than colon. This will input the emoticon ;-), which, in this example, was probably intended by the user.

Thus, the present invention allows for either a multi-tap method or, equivalently, a symbol advance key, or a predictive system, or all of the above to be used to select symbols within an ordered group. It is, indeed, a unique feature of this invention to allow both a multi-tap method and a predictive method to co-exist seamlessly within a single apparatus.

Returning to the example phrase "cu 8r :-)", and referring now to FIG. 6, we see that the phrase can be entered with the help of the first, second, and third auxiliary keys as follows, using either using a symbol advance key or predictive software: In step 6001, the third auxiliary key 1007 is actuated, and the key 1004 is actuated as well. This inputs the letter "c". In step 6002, the third auxiliary key 1007 is released, and in step 6003 key 1015 is actuated. In this example, we will assume that 1) in the present context the ordered group input by the 1015 key is (vu), and 2) predictive software is provided such that when a space is entered directly after the key 1015 is actuated, then v is changed into a u. Then, in step 6003, a v will be input, but, when space is entered in step 6004, using the 1001 key, the v will be changed into a u. If desired by the user, a u could also be obtained by substitution of an alternate step 6004 (alt), in which the symbol advance key 1002 is actuated to change the v into a u before proceeding to enter a space. In either case, the phrase can be completed in the same way as disclosed in FIG. 4. This seamless integration of multi-tap and predictive methods has the advantage that the user can decide, at any given moment, to trust the predictive system to produce the desired result once sufficient context has been provided, or take direct control of the input using the symbol advance key, or its multi-tap equivalent action.

Basic Punctuation Symbol Set

As previously recited, it is an important aspect of the present invention to reduce the average-case number of keystrokes required to input symbols. In the case of input of punctuation, it is important, therefore, to distribute the punctuation symbols over the keys in such a way that the most-common symbols can be entered with the fewest keystrokes. By statistical analysis it has been determined that some of the most common symbols are space ( ), period (.), comma (,), apostrophe ('), exclamation point (!), question mark (?), underscore (), hyphen (-), left parenthesis ( ( ), right parenthesis ( ) ), colon (:), at sign (@), slash (/), percent (%), star (★) and pound (#). All of these common symbols can be provided on a standard telephone key pad augmented with a punctuation key and a disambiguation key in such a way that each takes only one keystroke to enter. This symbols will be referred to as the basic symbol set. Though the basic symbol set was determined through statistical analysis, and is our preferred embodiment of this symbol set, it is evident to one skilled in the art that one or more of the symbols could be substituted for other symbols without escaping the scope of this invention. The essential feature of the basis symbol set is that they are most common punctuation symbols. The basic punctuation symbol set is sufficient to provide enough punctuation to support short messaging applications, as well as the entry of email addresses and most URLs. A secondary symbol set can be defined including the symbols tab, &, $,:, {,},[,], ~,',",|,\, and so on. Input of symbols in the secondary symbol set will be discussed below.

Preferred Association of the Elements of the Basic Symbol Set with the Keys of a Standard Telephone Keypad In the application of the present invention to improvement of the standard telephone keypad, implementation decisions must be made as to 1) which symbols to associate to which keys, and 2) in the case in which a given key has more than one ordered group, which group to include the symbol in. The present teachings allow for a wide variety of choices. In view of our presently available information, the following choices are optimal.

Period, comma and space. These very common symbols occur with greater frequency than many letters do. In a preferred embodiment, space is placed on the 1001 key and period on the 1003 key. To enter this symbols, no associated activation of an auxiliary key is required. Comma is also placed on the 1003 key. In the case that no disambiguation key is present, comma is in an ordered group with period, that is, the ordered group comprising (.,). In the case that a disambiguation key is present, comma is in its own ordered group, and selected using the disamiguation key.

Star and pound. The placement of these symbols is dictated by ISO convention. In the preferred embodiment of this invention, they are associated with the 1001 and the 1002 key respectively.

Apostrophe. In English, The apostrophe is a punctuation symbol with particularly strong statistical correlations with letters. This property allows predictive software to do a good job on predicting its occurrence in symbol strings. Thus, it can be included in an ordered group comprising letters. In a preferred embodiment, it is placed on the 1012 key, in the ordered grouping comprising letters on that key. In other languages, other punctuation symbols may be subject to the same treatment.

The Ten Numeric-like punctuation symbols. There are 10 common punctuation symbols which can be put into a close one-to-one correspondence with the digits. This correspondence is based on morphic similarity of the symbols in common fonts. That is, exclamation point (!) is similar in form to the digit 1, question mark (?) is similar in form to the digit 2, % is similar in form to the digit 3, underscore () is similar in form to part of the digit 4., hyphen (-) is similar in form to part of the digit 5, left parenthesis ( ( ) is similar in form to part of the digit 6, slash (/) is similar in form to part of the digit 7, colon (:) is similar in form to part of the digit 8, right parenthesis ( )) is similar in form to part of the digit 9, and the at sign (@) is similar in form to the digit 0. The standard telephone keypad assigns the digits 1, 2, 3-9 and 0 to the keys 1003, 1004, 1010 respectively. Thus, according to the assignment determined by the preferred embodiment of this invention, the punctuation symbols !?%-(/:)@ are assigned to the keys 1003, 1004, 1010 respectively.

Morphic Overlap

One of the surprising and highly useful features of the just described association of punctuation symbols to digits is that the morphic similarity allows punctuation symbols and digits to occupy substantially the same keypad surface real estate. By superimposing each digit with its associated punctuation symbol, very small keys can be labeled in such a way as to make both the digits and the punctuation symbols visible. The visually marked presence of all symbols which may be entered allows beginning users to scan the keys to find either their desired digit or punctuation symbol. Further, it increases ease of learning, since the morphic similarity helps the user remember which key is associated with which symbols. By proper coloring, lighting with an illumination apparatus, font design, and other visual means, both superimposed digit and superimposed punctuation symbol can be made clearly visually distinct on the keypad, even though they are superimposed on the keypad. Though this invention does not require punctuation symbols to be overlapped with associated digits, it teaches how to do so if desired. Association of the digits with the punctuation symbols increases discoverability of the keypad, as does proper use of visual cues. In a preferred embodiment of this invention, the color of the digit labels is the same as the color of the digit key, the color of the punctuation symbol labels is the same as the color of the punctuation key, and the color of the labels of unambiguous letters selected by the disambiguation key is the same the color of the disambiguation key itself.

Figure 9A:
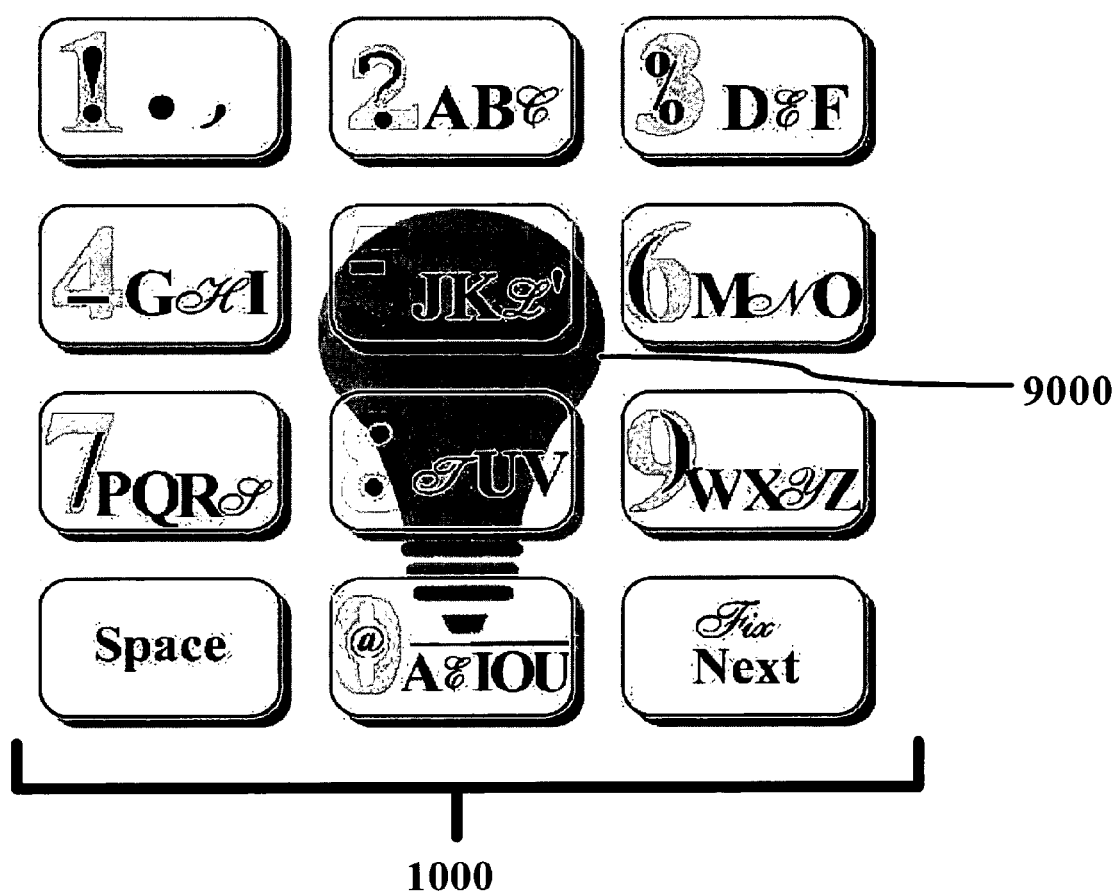
FIG. 9A shows an illumination apparatus representing backlighting of the keypad of FIG. 1 with backlighting turned off.
Figure 9B:
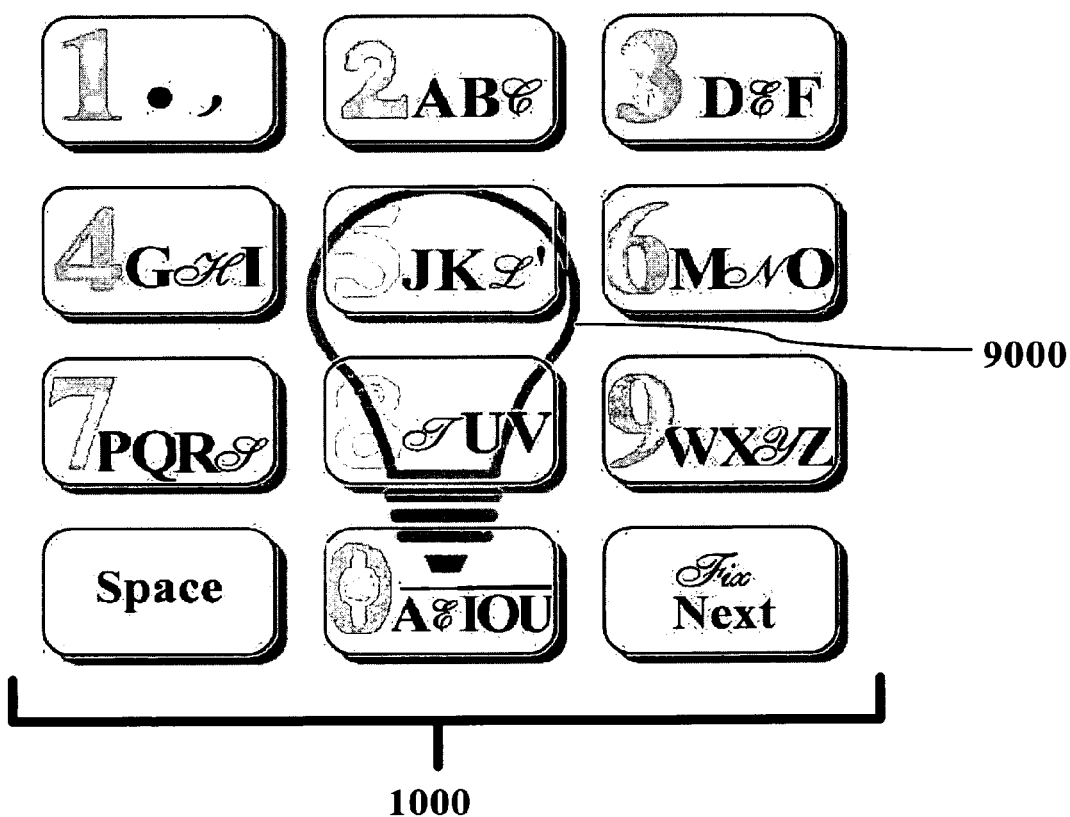

FIG. 9A shows an illumination apparatus 9000 representing backlighting of the keypad of FIG. 1 1000, with the backlighting turned off. In this embodiment, some punctuation symbols are printed on translucent material or simply cut out of the key material, so they appear dark when the backlight is turned off. FIG. 9B shows the same illumination apparatus 9000 and the same keypad 1000 with the backlight turned on, causing the punctuation symbols printed on translucent material to appear more brightly, in lower contrast to the digit labels on the same key in substantially the same location superimposed on the keypad.

The Secondary Symbol Set

Thus far, we have placed 15 punctuation symbols in a preferred arrangement on the telephone keypad. However, the standard desktop keyboard may encode 32 or more punctuation symbols. Continuing the application of the morphic similarity aspect of the teachings of this invention, most of these can be conveniently associated to keys on the telephone keypad in a way which maintains discoverability, reduced worst-case keystroke number, and reduced average case keystroke number. The placement of these secondary symbols provides graduated discoverability. Once the user has discovered how the primary symbols are associated to the digits through morphic similarity, they can accurately guess where other symbols are placed, even if there is no visual marker of the association of these secondary symbols with keys. For example, once the principle of morphic similarity has been discovered, it can be guessed that the semi-colon (:) should be associated to the key 1015, which is labeled with a colon (:). If the semi-colon is placed an ordered group with colon (:;) then the user, once he or she has understood that the symbol advance key works to advance in the symbol order, will understand that to obtain a semi-colon, the punctuation key 1005 must be actuated in conjunction with the 1015 key, and then the symbol advance key 1002 must be actuated. This is the essence of discoverability: allowing the user to extend experience gained from operation of one aspect of the mechanism to operation of other aspects of the invention.

In the same way, the pipe symbol (|) can be placed in an ordered group with the exclamation point (!), the back-slash (\) placed in an ordered group with slash (/), and so on to form the groups ((([{"<),( )]">), (−=+), (") (which group may additionally contain letters), and (~ˆ). These latter associations are not as morphically strong as the previous associations described, and they also contain less frequently used symbols. Thus, a keypad designer has some freedom to chose the location of the symbols, and may even chose to leave these symbols out entirely. On keypads which include keys beyond the 12 keys of the standard keypad, some of the keys may be used to encode more common secondary symbols. For instance, in the embodiment of FIG. 1, the & symbol is associated with the back-space functional symbol on key 1008, and the $ symbol is associated with the Caps/CapW functional symbols on key 1009.

Functional Morphology

Some punctuation and functional symbols, such as tab or backspace, have no morphic representation, and morphic similarity is not a placement guide. Thus placement of these symbols requires an abstraction of morphic similarity. Thus space, newline, backspace, and tab bear some family resemblance in that each serves to manipulate the location of the next symbol to be input. Given this teaching of association of symbols by functional morphology, various schemes may be employed to embody associations according to these teachings. A preferred choice in the application of these methods to telephone keypads is to associate newline with multiple space symbols. Thus, when the ôspace keyö 1001 is pressed once, the space symbol is entered, and when it is pressed twice in succession, a space and then a newline is entered. Each additional successive press of key 1001 produces additional newlines. An alternative embodiment might, for instance, have one press input the space symbol, two presses input a tab symbol, and each subsequent press input a tab symbol.

Auxiliary keys, when present, can also be used to distinguish members of a family bound by functional morphologic similarity. For instance, a digit key actuated in conjunction with a space key could represent a tab symbol, in as much as a tab is a multiple of a space. Thus, in a preferred embodiment of this invention, the digit key 1006 actuated in conjunction with the space key 1001 produces the tab functional symbol. If another auxiliary key is present, such as the disambiguation key 1007, it could be actuated in conjunction with the space key to produce a backspace. This is not the mechanism chosen in the preferred embodiment shown in FIG. 1. There, a separate key, 1008, is used to input backspace. This illustrates an alternate mechanism to encode backspace, preferred for its discoverability. However, design constraints may not allow a key to be devoted to this purpose, and if they do not, the key 1007-1001 combination for inputting backspace is preferred.

Predictive Punctuation

It has already been pointed out that punctuation symbols may have sufficient statistical correlation with other symbols, such as letters, to allow predictive mechanisms to operate to reduce the expected number of keystrokes in a non-trivial way. The preferred embodiment of this invention disclosed herein has an aspect which lends itself to the predictive approach to the entry of punctuation symbols. In the preferred embodiment, punctuation symbols which are mophologically similar to the left parenthesis symbol: (ææ[{ and < are in turn associated to the digit 6, and symbols morphologically similar to the right parenthesis symbol )ö]} and > are associated in turn to the digit 9. Left-parenthesis-like symbols have a functional-morphological relationship with right parenthesis like symbols in that left-parenthesis-like symbols often occur in matching pairs with right-parenthesis-like symbols. This pair-matching property can be used to reduce the expected number of keystrokes required to enter these symbols. Consider entry of the sentence: <so then (after) we'll "go">. If the ordered punctuation group on the 6 key is ("[{<, and the ordered group on the 9 key is )"]}>, then using a symbol advance key to enter the parenthesis-like symbols would require: five keystrokes to enter <, one keystroke to enter (, one keystroke to enter ), two keystrokes to enter ", two keystrokes to enter ", and five keystrokes to enter >, for a total of 16 keystrokes. However, according to the teachings of this invention the order of the right parenthesis-like symbols can be set as a function of the left-parenthesis-like symbols in such a way as to reduce the number of keystrokes. A simple rule which accomplishes this is: the first symbol in the right-parenthesis-like ordered group should match the last-entered unmatched symbol in the left-parenthesis-like group. Applying this rule we have: five keystrokes to enter <, one keystroke to enter (, one keystroke to enter ) (right parenthesis matches left parenthesis, the last entered unmatched left-parenthesis-like symbol. This left-parenthesis-like symbol is now matched, and the last-entered unmatched left-parenthesis-like symbol is now <), two keystrokes to enter " (which becomes the new last-entered left-parenthesis-like symbol), one keystrokes to enter "(this now matches "), and one keystrokes to enter > (matching the remaining unmatched left-parenthesis-like symbol <), for a total of 11 keystrokes. Thus, in this example, the average number of keystrokes per parenthesis-like symbol has dropped from nearly 3 to less than 2, even though the worst-case remains 5 keystrokes per symbol. Even though the parenthesis-like ordered groups of symbols are large compared to other ordered groups, thanks to the pairing property of these symbols, the expected number of keystrokes can be kept small on these ordered groups.

Treatment of Accented Letters

The preferred embodiment of this invention extends the property of graduated discoverability to the treatment of accented letters. Many languages contain letters with accents, and any given letter may occur with many accents, depending on the language. Further depending on the language, consonants and/or vowels may be accented. While languages based on the roman alphabet can generally be read in the absence of accents, inclusion of accents increases the comfort of the native speaker of the language with the text being entered. Provision of mechanisms to enter accented letters on a reduced keyboard is thus highly desirable, and it further desired to make entry of these accented letters as easy as possible.

Predictive mechanisms can be employed to reduce the number of keystrokes required to enter accented letters, even when there are many accented letters, each accepting many accents. As in the treatment of digits, punctuation symbols and unaccented letters, the over-riding concerns for the machines built according to the teachings of this invention are reduction in keystroke number (an aspect of ease-of-use), and discoverability (an aspect of ease of learning). Discoverability is increased when familiar letter categories are used to help assign letters to keys. The method taught by the preferred embodiment of this invention for treating accented letters is to place accented consonants on the same key as their unaccented counterparts, and to place accented vowels together all on the same key, or on a few keys distinct from those keys which are used to input the unaccented vowels. Extensive numerical studies performed by the inventors show that this placement is not only easy to learn, it also is near optimal for reducing the number of keystrokes required to enter accented letters when predictive mechanisms are use to select accented letters for input priority. When applying these ideas to telephone keypads, it must be borne in mind that only a small number of symbols can be displayed on the surface of any key. In general, for most western european languages, the frequency of accented vowels is greater than the frequency of accented consonants. Therefore, in the treatment of these languages, it is preferable to represent the accented vowels on the key surface, but suppress the representation of accented consonants. In the preferred embodiment of this invention, key 1017 is used to input all accented vowels. It is to be noted that placing all accented vowels on a single key could result in quite large ordered groups. For example, for some languages, the ordered group might include e'e'eˆ a'a'aˆ, etc. (here the accent mark is written after the letter to which it applies). In these cases, it may be impossible to represent all of the accented letters on the face of a small key in such a way that they are visible to the unaided human eye. To alleviate this problem, an abstract form representing the plurality of available accents is preferred to concrete and detailed markings representing the individual accented letters. In FIG. 1. this abstract form is an overbar over all of the vowels, though other arrangements will be evident to one skilled in the art.

It is further disclosed that both the placement of the accented letters and the abstract form representing accents can be integrated according to the teachings of this invention with the action of the disambiguation key such that the action of the disambiguation key on accented letters, if any, is easily discoverable. In FIG. 1. it is revealed that the portion of the overbar which is over the letter e is visually distinct from the other portions of the overbar, and that the e itself shares a visual character (color, shading, font or other visual cue) relating it to the overbar, and to the disambiguation key. This visual relation system guides the user to understand that the disambiguation key should be actuated in conjunction with the 1017 key in order to input any accented e.

Visual Display as an Aid to Discovery

On phones with visual display screens it is possible to further guide the user to discover the keystroke combinations required to enter any symbol, even those which do not appear as explicit labels on the keypad. Recall that the symbols on a key are arranged in one or more ordered groups. The number of ordered groups is a function of the number of auxiliary keys which can operate in conjunction with the symbol key. Typically one of the ordered groups is the ordered group which is operative when the symbol key is pressed non-conjointly with some auxiliary key. In the preferred embodiment of this invention, as revealed in FIG. 1, key 1015 encodes the following four ordered groups (8)(:;)(t)(uv). The groups are selected by the digit key, the punctuation key, the disambiguation key, and no auxiliary key respectively. A beginning user may not understand how to use the auxiliary keys, and if an apparatus is fully discoverable, then the user will be guided to the correct actions without the need of verbal or written instruction. Imagine now that the digit key is a given color (say blue) and the digits on the symbol keys are also blue, the punctuation key is green and the punctuation symbols on the symbol keys are also green, the disambiguation key is red, and the disambiguated letters are also red, and that letters which are not affected by the disambiguation key are also black. Then, when a beginning user presses key 1015 they will see a display in which different ordered groups are displayed in different colors. The different colors displayed for the different groups provides the user with an indication as to 1) which auxiliary key to press to obtain the desired symbol, and 2) helps the user identify the symbols which are not explicitly labeled on the keys themselves. It will be evident to one skilled in the art that other visual cues such as shading or font style could be used instead of color to mark the ordered groups and their associated auxiliary keys. Indeed, referring now to FIG. 8, we see a visual display 8000 which has one ordered group 8001, containing "t" labeled in black, a second ordered group 8002, containing "uv" labeled in gray, a third ordered group 8003, containing the digit 8, in gray italic, and a final ordered group 8004 containing the punctuation symbols colon and semi-colon, labeled with an underline.

The Fix Key

The fix key functionality is specific to embodiments which incorporate a particular type of predictive text mechanism. Though commonly referred to in the art as "predictive" these mechanisms are also characterized as retroactive in that the display and input of symbols may be revised in light of subsequently entered symbols. When using such retroactive mechanisms, the means to block or undo these retroactive changes may be desirable. The fix key supplies these means. Whenever it is activated, the last retroactive change is undone. The fix key is designed to simplify the typing of non-words. A mode in which the predictive software can perform retroactive changes will be called automatic mode, and a mode in which retroactive changes cannot occur will be called manual mode. Beginning users may enter manual mode (by tapping next in automatic mode) whenever they encounter a word, such as a URL, not likely to be in a dictionary or reference list of words. While this is the safest approach to entering non-words, it may also throw away some of the power of automatic mode. Automatic mode may be capable of correctly entering many non-words, and require no extra taps per letter to do so, whereas manual mode may require a few extra taps on these words. The more sophisticated approach to entering non-words is to begin typing them in automatic mode, and only enter manual mode if something goes astray. Automatic mode will have gone astray if it retroactively changes letters which were correct before the retroactive change. When that happens, the user can press the fix key to 1) cancel the retroactive change, and 2) enter manual mode. An example where this might occur is when the user wishes to type a name in English of non-English origin, such as "Quader". When this word is input in automatic mode, the first 4 letters "quad" may appear correctly. However, upon pressing the "e" key, the display may changes to "pubde". At this point, the user can press the fix key to obtain "quade", and then complete the word in manual mode to obtain "quader".

Integration of Symbol Advance and Predictive Text Mechanisms

It has been revealed that the present invention allows for members of an ordered group to be selected either using the symbol advance key or predictive text mechanisms or both. It has also been revealed that a fix key can aid in a particular integration of predictive and multi-tap (or symbol-advance-key) mechanisms. In general, a good predictive text mechanism can be relied on to correctly enter sequences of letters which are common in a language. However, some sequences, such as URLs or email addresses may be beyond the predictive power of the algorithm. If the user desires to enter such a sequence, they may be required to wrest control from the predictive mechanism to enter the sequence using the potentially more laborious, but more certain method afforded by the symbol advance key (or, equivalently, a multi-tap method). According to the teachings of this aspect of this invention, when, in the course of entering a sequence of letters bounded by punctuation, a user activates the symbol advance key then for the remainder of the sequence, until the next punctuation symbol, the predictive mechanism will be prevented from making retroactive changes to the letter sequence being entered. The non-obvious reason for this restriction is that when the user activates the symbol advance key they are manifesting a desire to more closely control the behavior of the text-entry mechanism, and to not leave decisions as to which letter to display to predictive software. The situation is similar to a driver of an automatic-shift car moving into manual-shift mode when driving on a slippery patch of road. When a punctuation symbol (typically a space symbol) is entered, this signals that the user has completed the difficult or unusual sequence, and full operation of the predictive software is restored.

In conclusion, it is noted that many modifications to the embodiments discussed in this specification will be evident to one skilled in the art, the full scope of this invention can only be appreciated in reference to the attached claims.

What is claimed is:

1. An apparatus for the input of symbols, comprising:
a plurality of keys for inputting symbols, said plurality of keys having both:
   a) a digit, and
   b) at least one punctuation symbol assigned to the keys,
said keys characterized in that, for each key having a digit and a punctuation symbol assigned to it:
the punctuation symbols and digits are overlapped in fonts and the at least one punctuation symbol associated with the key is morphically similar to the digit assigned to the key, wherein the at least one punctuation symbol is assigned to the key based upon at least the punctuation symbol being morphically similar to the digit assigned to the key, such that:
   the punctuation symbol and digit occupy substantially the same keypad surface real estate when the punctuation symbols and digits are overlapped in fonts, wherein said at least one punctuation symbol and said digit being presented at a same time.

2. The apparatus of claim 1, wherein said apparatus comprises at least one key that inputs a set of said symbols comprising:
a digit correlated to a number "1", and
wherein said punctuation symbol is an exclamation point.

3. The apparatus of claim 1, wherein said apparatus comprises at least one key that inputs a set of said symbols comprising:
a digit correlated to a digit "2", and
wherein said punctuation symbol is a question mark.

4. The apparatus of claim 1, wherein said apparatus comprises at least one key that inputs a set of said symbols comprising:
a digit correlated to a number "3", and
wherein said punctuation symbol is a percent sign.

5. The apparatus of claim 1, wherein said apparatus comprises at least one key that inputs a set of said symbols comprising:
a digit correlated to a number "4", and
wherein said punctuation symbol is an underscore.

6. The apparatus of claim 1, wherein said apparatus comprises at least one key that inputs a set of said symbols comprising:
a digit correlated to a number "5", and
wherein said punctuation symbol is a hyphen.

7. The apparatus of claim 1, wherein said apparatus comprises at least one key that inputs a set of said symbols comprising:
   a digit correlated to a number "6", and
   wherein said punctuation symbol is a left parenthesis.

8. The apparatus of claim 1, wherein said apparatus comprises at least one key that inputs a set of said symbols comprising:
   a digit correlated to a number "7", and
   wherein said punctuation symbol is a slash.

9. The apparatus of claim 1, wherein said apparatus comprises at least one key that inputs a set of said symbols comprising:
   a digit correlated to a number "8", and
   wherein said punctuation symbol is a colon.

10. The apparatus of claim 1, wherein said apparatus comprises at least one key that inputs a set of said symbols comprising:
    a digit correlated to a number "9", and
    wherein said punctuation is a right parenthesis.

11. The apparatus of claim 1, wherein said apparatus comprises at least one key that inputs a set of said symbols comprising:
    a digit correlated to a number "0", and
    wherein said punctuation symbol is an "at" sign.

12. The apparatus of claim 1,
    wherein each digit has an outer outline,
    said apparatus having:
       a) a visual label identifying said digit; and
       b) a label identifying said punctuation symbol as being assigned to said key,
    said respective labels simultaneously displaying said punctuation symbol which is superimposed substantially within said outer outline of said digit.

13. The apparatus of claim 12, further comprising:
    an illumination apparatus effective to highlight one of:
       said punctuation label, and
       said digit label
    as substantially superimposed.

14. The apparatus of claim 1, wherein at least one said key of said plurality of said keys is a multiple-ordered-group key to which multiple ordered groups of symbols have been assigned, said apparatus further comprising:
    an iterator key, engaged with said at least one multiple-ordered-group key, to select members of said ordered groups for input and presentation to the user, consecutively in an order,
    wherein said order of symbols of each of said ordered groups that are assigned to any given of said ordered groups of said multiple-ordered group key is fixed independently of the actuation of any other multiple-ordered-group keys, and
    wherein said orders of said ordered groups of symbols assigned to said given multiple-ordered-group key are independent of said orders of said ordered groups assigned to other multiple-ordered-group keys
    such that actuation of said iterator key to advance symbols assigned to said given multiple-ordered group key advances symbols assigned to said same multiple-ordered-group keys.

15. The apparatus defined in claim 1, wherein a plurality of said keys having:
    a) a digit and
    b) a morphically similar punctuation symbol
    assigned to them have:
       said digit and said punctuation symbol simultaneously displayed,
       with said punctuation symbol overlapped with its associated digit.

16. The Apparatus of claim 1, wherein said at least one punctuation symbol being assigned to the key based upon at least the punctuation symbol being morphically similar to the digit assigned to the key, is a visually morphically similar type of morphic similarity, wherein said visually similar type of morphic similarity is a non-functional type of morphic similarity.

\* \* \* \* \*